US008900049B2

(12) United States Patent
Bennett

(10) Patent No.: US 8,900,049 B2
(45) **Date of Patent: *Dec. 2, 2014**

(54) GAMING SYSTEM AND A METHOD OF GAMING

(75) Inventor: Nicholas Luke Bennett, Manly Vale (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,489

(22) Filed: Aug. 13, 2012

(65) Prior Publication Data

US 2012/0309482 A1 Dec. 6, 2012

Related U.S. Application Data

(63) Continuation of application No. 12/340,705, filed on Dec. 20, 2008, now Pat. No. 8,287,355.

(30) Foreign Application Priority Data

Dec. 21, 2007 (AU) ................................ 2007907069

(51) Int. Cl.

*A63F 9/24* (2006.01)
*A63F 13/00* (2014.01)
*G07F 17/32* (2006.01)

(52) U.S. Cl.

CPC .................................. *G07F 17/3244* (2013.01)
USPC ........................................................... 463/20

(58) Field of Classification Search

USPC ........................................................... 463/20
See application file for complete search history.

(56) References Cited

U.S. PATENT DOCUMENTS

| | | | | |
|---|---|---|---|---|
| 6,120,377 | A | 9/2000 | McGinnis et al. | |
| 7,819,741 | B1 | 10/2010 | Luciano | |
| 2003/0027628 | A1 | 2/2003 | Luciano | |
| 2006/0246989 | A1 * | 11/2006 | Glavich et al. | 463/16 |
| 2008/0045295 | A1 * | 2/2008 | Walker et al. | 463/16 |
| 2009/0253479 | A1 | 10/2009 | Bennett et al. | |
| 2011/0003627 | A1 * | 1/2011 | Nicely et al. | 463/20 |
| 2012/0270636 | A1 * | 10/2012 | Tarantino | 463/22 |
| 2013/0252700 | A1 * | 9/2013 | Nguyen | 463/20 |
| 2014/0094261 | A1 * | 4/2014 | Visser | 463/20 |

* cited by examiner

*Primary Examiner* — Pierre E Elisca

(74) *Attorney, Agent, or Firm* — McAndrews, Held & Malloy, Ltd.

(57) ABSTRACT

The present invention relates to a gaming system and a method of gaming that includes a wheel game.

A displayed representation of the wheel game is a wheel having a number of segments. Each segment is associated with a particular game outcome and an indicator indicates the segment with the selected game outcome for a particular game. At least one of the segments is associated with a game outcome which requires a further play of the wheel game. Outcomes of the wheel game are adjusted before play of the further game, which is then played including the adjusted available game outcomes.

In an embodiment, the game outcomes are adjusted by multiplication factor, which is determined by a further selector, in an embodiment represented as a die at the center of the wheel.

25 Claims, 7 Drawing Sheets

400

| | 1 | 2 | 3 | 4 | 5 | |
|---|---|---|---|---|---|---|
| | Q | J | A | 5 | 6 | T |
| | JP | 5 | 9 | A | 7 | C |
| | Q | K | JP | 10 | 7 | B |

GAMING SYSTEM AND A METHOD OF GAMING

RELATED APPLICATIONS

This application is a continuation of, and claims priority to, U.S. patent application Ser. No. 12/340,705, filed on Dec. 20, 2008, which also claims priority to Australian Provisional Patent Application No. 2007907069, having a filing date of Dec. 21, 2007, both of which are incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a gaming system and to a method of gaming, and, particularly, but not exclusively, to a method and system of gaming that includes a wheel game.

BACKGROUND OF THE INVENTION

Games comprising a wheel or representation of a wheel and an indicator which moves relative to the wheel are known. These "wheel games" may be implemented as mechanical wheels, electro-mechanical wheels or generated by electronic displays such as video displays. Each wheel usually comprises a number of segments, each segment representing a particular game outcome.

Gaming systems are known which utilise wheel games as secondary or "feature" games in addition to a "base" game played by the gaming system.

It is also known to provide a gaming system which comprises a game controller which is arranged to randomly display several symbols from a pre-determined set of symbols and to determining a game outcome such as a game win based on the displayed symbols. Such gaming systems may commonly be implemented as a stepper machine provided with reels with each reel carrying several symbols of the set, or a video machine where the selected symbols are displayed as virtual reels on a graphical display device. Outcomes can occur based on symbols appearing on one or more horizontal lines, diagonal lines, or in any other pre-determined way.

It is known in gaming systems to provide reel games as a base game and a wheel game as a feature game generated as an outcome of the base reel game e.g. a particular symbol or symbol selection occurring in the base game may result in generation of a feature game played as a wheel game.

A problem with wheel games is that gaming regulations for some markets, including most Australian markets, require that the odds for wheel games must reflect the odds that a person would expect from viewing the wheel. For example, a wheel with six segments would generally be expected to carry odds of 6:1 for selection of a particular segment. This makes it more difficult to offer large prizes on a wheel because the larger the prize, the more effect it will have on the overall return to the player of the game. To support a large prize, either the chances of the player actually activating the wheel feature have to be very low or the amount of the average wager of the player needs to be high.

An advantage of wheel games is that it has been found that players find them particularly entertaining and are attracted to playing games which involve wheel games. While current wheel games provide users with enjoyment, the need exists for alternative gaming systems in order to maintain and increase player enjoyment.

BRIEF SUMMARY OF THE INVENTION

In accordance with a first aspect, the present invention provides a gaming system, comprising a game controller arranged to control operation of a first game having a plurality of available game outcomes, and a display arranged to display a representation of play of the first game, the representation comprising a selector having a plurality of outcome indicating parts and an indicator, the game controller being arranged to determine a first game outcome for the first game from the plurality of available game outcomes, and control the indicator to indicate the outcome indicating part associated with the first game outcome, at least one of the first game outcomes comprising a re-spin outcome, wherein, when the game controller determines that the first game outcome is the re-spin outcome, the game controller is arranged to adjust at least one of the available game outcomes and control the first game to be played again including the adjusted available game outcome.

In an embodiment, the at least one available game outcome is adjusted to vary a prize associated with the game outcome.

In an embodiment, when the first game outcome is determined to be a re-spin outcome, the game controller is arranged to determine the adjustment for adjusting the at least one of the available game outcomes, and is arranged to control the display to display a representation of a further selector. In an embodiment, the representation comprises a display of a die which is arranged to spin and settle to show a face which represents the adjustment outcome. For example, it may settle on the number 5 if the game controller chooses 5 as the outcome. The outcome may be randomly selected. In this embodiment, a prize of at least one of the available game outcomes would be adjusted by multiplying it by five. An advantage of the provision of the further selector is that it provides a second level to the first game which advantageously increases the entertainment provided to a player. It may also allow for high prizes to be awarded for the first game, as the first selector can increase the prizes available from the outcome indicating parts of the first game, but there may be a relatively low chance of obtaining the further selector for the first game. In an embodiment, the first game is a wheel game and each of the outcome indicating parts is represented as a segment of the wheel, including the re-spin outcome indicating parts. The further selector may be represented on the display at the centre of the wheel.

In an embodiment, the gaming system comprises an alternative first game which may be selected instead of the first game. In an embodiment, the alternative first game comprises the same type of representation as the first game (eg a wheel game representation), but may provide for different prizes. In an embodiment, the gaming system comprises a player interface enabling a player to select between the first game and the alternative first game. In an embodiment, the first game and alternative first game have different volatilities.

In an embodiment, the game controller is arranged to control operation of a second game. In an embodiment, an outcome of the first game indicates a prize which depends on the second game. In an embodiment, the outcome of the first game is a multiplier, multiplying a prize awarded to the player by the second game. In an embodiment, the game controller further comprises a symbol selector arranged to select a plurality of symbols from a set of symbols for play of the second game. In an embodiment, the second game is represented as a reel game, the selected symbols being represented as appearing on virtual reels, or appearing on physical reels.

In an embodiment, the first game and second game may be generated as a feature game in response to an outcome of a base game. The base game, may, for example, be a typical reel game where the game controller is arranged to randomly select and display several symbols from a pre-determined set of symbols and to determine a game outcome such as a game win based on selected symbols. In this embodiment, one game outcome is a trigger for the feature game, which results in the first and second game being played.

In accordance with a second aspect, the present invention provides a gaming system, comprising a game controller arranged to control operation of a game, and to control display of a representation of play of the game, the representation comprising a selector having a plurality of outcome indicating parts and an indicator, the game controller being arranged to determine a game outcome for the game from the plurality of available game outcomes, and control the indicator to indicate the outcome indicating part associated with the game outcome, the game controller further being arranged to determine an adjustment factor for adjusting an outcome of at least one of a plurality of available game outcomes, and to control display of a representation of a further selector to display the adjustment factor.

In an embodiment, the game is a wheel game and the selector is represented as a wheel, each of the outcome indicating parts comprising a segment of the wheel. In this embodiment, the further selector is represented as a multiplier, having a plurality of multiplier outcomes, each outcome being arranged to adjust a prize associated with an outcome indicating part of the wheel by a multiplication factor. In an embodiment, the further selector may be represented in the display as a die which is arranged to be "rolled" under control of the game controller. The die may be represented on the display at the centre of the wheel.

In accordance with a third aspect, the present invention provides a method of gaming, comprising the steps of playing a first game having a plurality of available game outcomes, displaying a representation of play of the first game, the representation comprising a selector having a plurality of outcome indicating parts and an indicator, determining a first game outcome for the first game from the plurality of available game outcomes, and controlling the indicator to indicate the outcome indicating part associated with the first game outcome, wherein at least one of the first game outcomes comprises a re-spin outcome, and when it is determined that the first game outcome is the re-spin outcome, adjusting at least one of the available game outcomes and playing the first game again with the adjusted available game outcome.

In accordance with a fourth aspect, the present invention provides a method of gaming, comprising the steps of playing a game having a plurality of available game outcomes, displaying a representation of play of the game, the representation comprising a selector having a plurality of outcome indicating parts and an indicator, determining a game outcome for the game from the plurality of available game outcomes, and controlling the indicator to indicate the outcome indicating part associated with the game outcome, determining an adjustment factor for adjusting an outcome of at least one of the plurality of available game outcomes, and displaying a representation of a further selector displaying the adjustment factor.

In accordance with a fifth aspect, the present invention provides a computer programme comprising instructions for controlling a computer to implement a gaming system in accordance with the first aspect of the invention.

In accordance with a sixth aspect, the present invention provides a computer readable medium providing a computer programme in accordance with the fifth aspect of the invention.

In accordance with a seventh aspect, the present invention provides a data signal comprising a computer program in accordance with the fifth aspect of the invention.

In accordance with an eighth aspect, the present invention provides a computer programme comprising instructions for controlling a computer to implement a gaming system in accordance with the second aspect of the invention.

In accordance with a ninth aspect, the present invention provides a computer readable medium providing a computer programme in accordance with the seventh aspect of the invention.

In accordance with a tenth aspect, the present invention provides a data signal comprising a computer program in accordance with the eighth aspect of the invention.

BRIEF DESCRIPTION OF SEVERAL VIEWS OF THE DRAWINGS

Features and advantages of the present invention will become apparent from the following description of embodiments thereof, by way of example only, with reference to the accompanying drawings, in which.

DETAILED DESCRIPTION OF THE INVENTION

Figure 1:
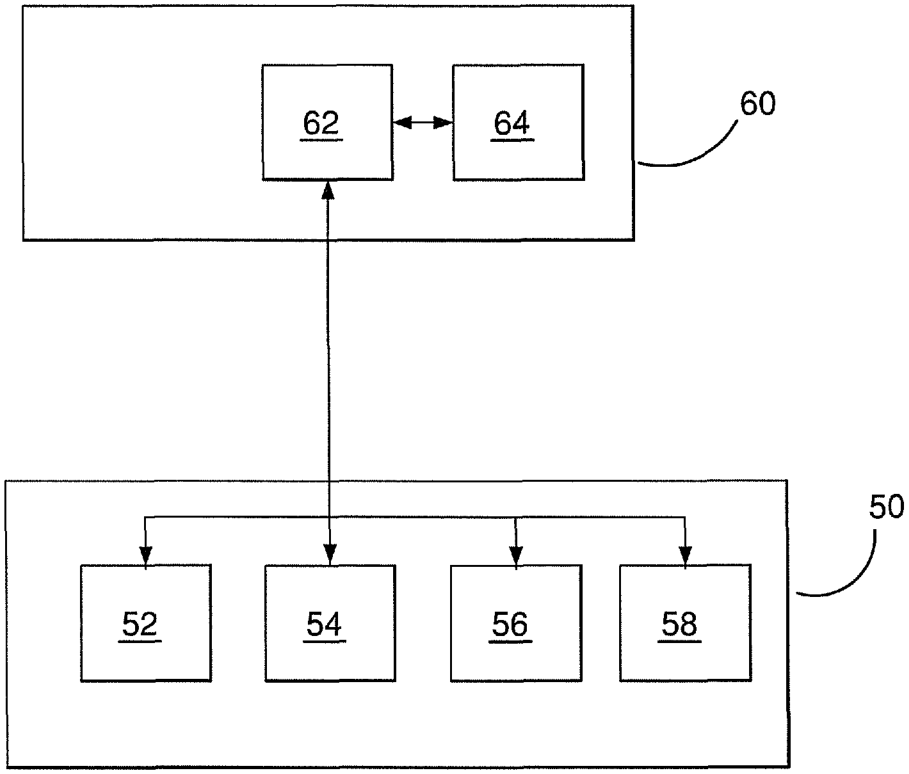
FIG. 1 is a schematic block diagram of core components of a gaming system in accordance with an embodiment of the present invention.

Referring to the drawings, there is illustrated an example embodiment of a gaming system which is arranged to implement a game. The gaming system includes a game controller and display arranged to display representations of the game. The representations comprise a selector having a plurality of outcome indicating parts and an indicator, and in this example embodiment the representations comprise a wheel game. Each of the outcome indicating parts make up a segment of the wheel game. One of the outcome indicating parts includes a re-spin outcome. If this outcome is determined by the game controller, the game is played again, with at least one of the available game outcomes being adjusted to vary a prize associated with the game outcomes.

Figures 7, 8:
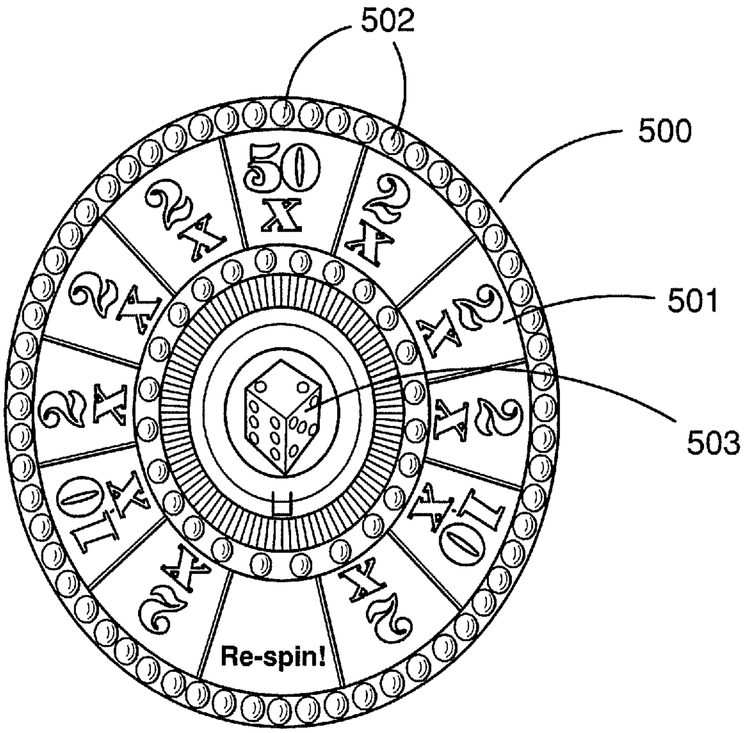
FIGS. 7 and 8 are representations of example displays generated by a gaming system in accordance with an embodiment of the present invention.

A representation of an example wheel game is illustrated in FIG. 7.

An advantage of having a re-spin feature is that it enables higher prizes to be awarded by the outcome indicating parts when re-spin occurs and the game is re-played (e.g. the game moves to a "second level" of prizes).

The gaming system of this embodiment of the invention can take any number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
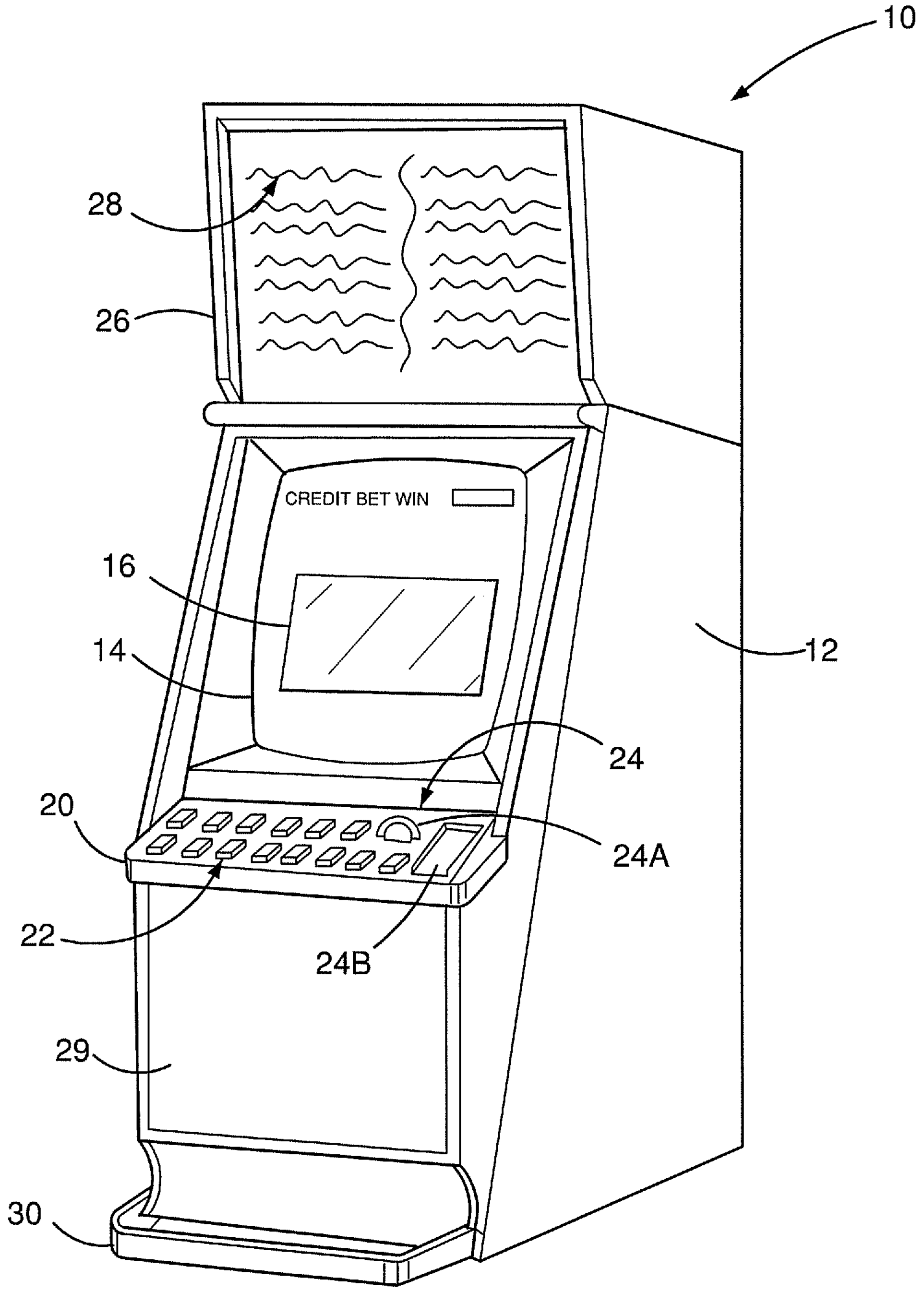
FIG. 2 is diagrammatic representation of a gaming system in accordance with an embodiment of the present invention with the gaming system implemented in the form of a stand along gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
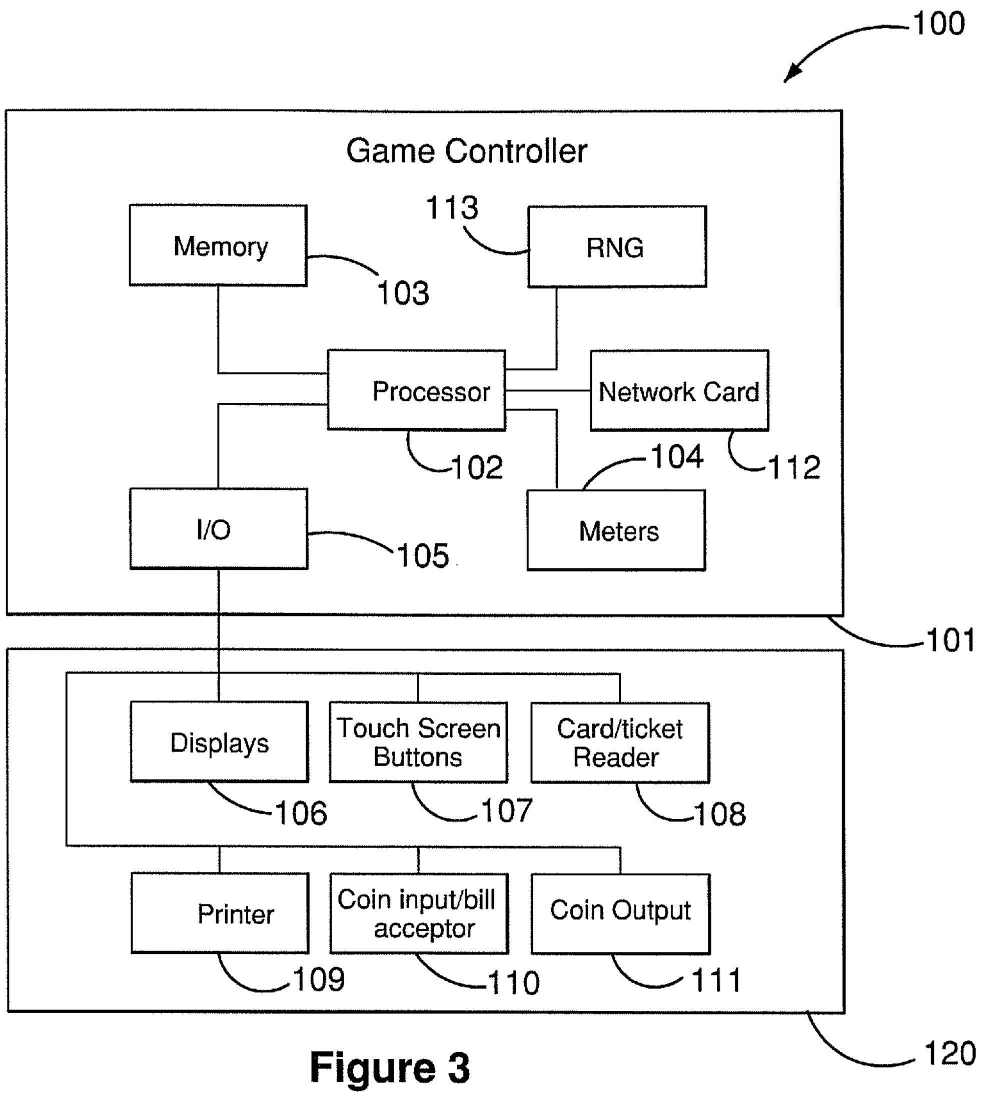
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
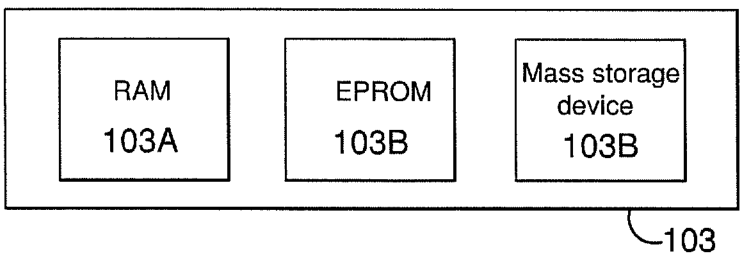
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
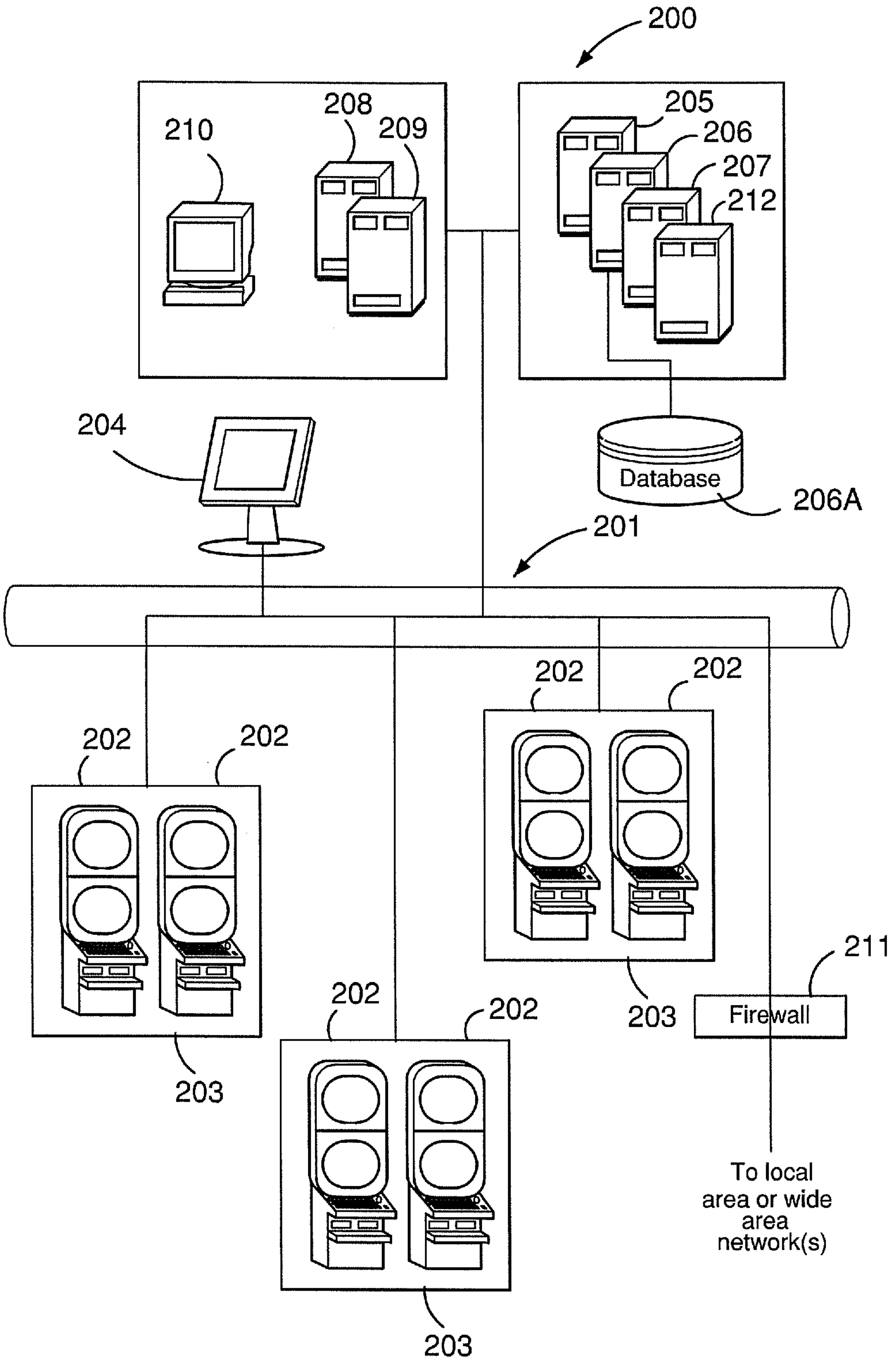
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Figure 6:
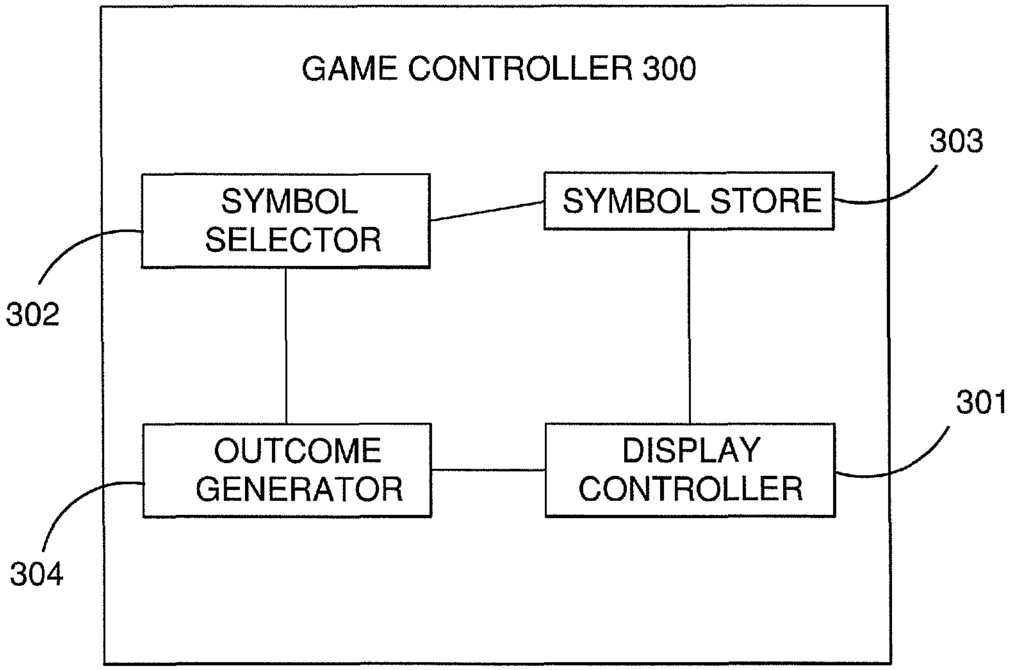
FIG. 6 is a schematic diagram of functional components of a gaming system in accordance with an embodiment of the present invention.

Referring to FIG. 6, the functionality of embodiments of the present invention may be implemented by a game controller having the functional components illustrated. In this embodiment, the functional components are implemented utilising a processor and memory, (such as processor 102 and memory 103 in FIG. 3, or processor 62 and memory 64 in FIG. 1, for the game server 205 in FIG. 5) and associated programming. Other implementations are envisaged. For example the functional blocks of FIG. 6 may be implemented in hardware as separate units, or a combination of hardware and software as separate units. Any practical implementation of these functional units may be employed.

In this embodiment, the game controller 300 is arranged to control the gaming system to play a base game which comprises selection of a plurality of symbols from a set of symbols. The base game is implemented as a "reel" game. The game controller 300 comprises a display controller 301 which is arranged to control the display (reference numerals 54, 14, 106, 204 of previous figures) to emulate a representation of reels bearing symbols. Alternatively, the display may comprise a stepper motor and physical reels bearing the symbols.

The game controller 300 includes a symbol selector 302 which is arranged to select a plurality of symbols from a set of symbols available in a symbol store 303. An outcome generator 304 is arranged to determine an outcome of the base game. In this embodiment, the outcome of the base game depends on the selected symbols and may include a win outcome, loss outcome, a feature outcome, or other outcome. Outcomes may be determined on the basis of symbols appearing in one or more horizontal lines, diagonal lines, or any other pre-determined combinations.

FIG. 8 shows a schematic representation of a gaming machine display 400 which, in the example shown, has five reels (numbered "1" to "5"). The display window 401 shows three reel positions high when the reels have stopped/the symbols have been selected. The reel positions are designated Bottom ("B"), Centre ("C") and Top ("T"). This is a typical reel-type display for a gaming machine. It will be appreciated that in other embodiments the number of reel positions may be more or less than in display 400. Also the number of reels may be more or less than in the display 400.

The reels may be virtual reels, generated as a video display from the selected symbols, actual mechanical reels carrying the symbols and driven by a stepper motor, or any other reel arrangement or emulation. In the case of actual physical reels, the game controller drives a stepper motor to randomly select the symbols appearing in the display 400.

The game outcome is determined by the outcome generator 304 based on combinations of symbols selected and appearing in the display 400. The symbols may be any symbols. As will be appreciated, many different types of symbols are used in gaming systems. A set of symbols may include standard symbols and function symbols. For example, standard symbols may resemble fruit such as apples, pears and bananas with a win outcome being determined when a predetermined number of the same fruit appear on a display in the same line, scattered, and so on. The function associated with a function symbol may be a "wild" function wherein display of the function symbol is treated during consideration of the game outcome as any of the standard symbols. Other functions may include scatter functions, multiplier functions, repeat win functions, jackpot functions and feature commencement functions.

In the example shown in FIG. 8, the symbols are representations of cards, by which a poker-type card game may be played. In this example, a winning poker hand appearing on the C line may cause the outcome generator to determine that a Win has occurred and that an appropriate prize may be awarded. For example, five of a kind (e.g. 5 jacks "J". 5 tens "10" etc on the C line may result in a win. A straight or a straight flush or any other poker combination on the C line may also result in a win.

In addition to card symbols, the symbols also include a Wild "W" symbol which is a function symbol which, when it occurs on the C line may be considered by the outcome generator 304 to operate as any symbol which may assist in a win. Symbols also include a Jackpot ("JP") symbol which when five JP symbols appear on the C line may result in a jackpot win. The jackpot may be a progressive jackpot, a linked progressive jackpot, or any other type of jackpot.

The diagram shown in FIG. 8 is schematic only and it will be appreciated that embodiments of the invention may implement the symbols graphically, with fancy artwork or in any other appropriate manner.

At least one of the base game outcomes is a trigger for a feature game. The trigger may be any combination of symbols, including a line of symbols or a scatter. Any trigger condition may be determined to instigate the feature game. Multiple trigger conditions may exist. A trigger condition may be based on a measure of time, a particular amount of activity on the machine, based on player tracking information or may be a random event, or any other trigger condition. The trigger condition will be determined by the game designer.

In this embodiment, the feature game comprises a first game and a second game. The first game is represented on the display as a selector having plurality of outcome indicating parts and an indicator. In this example it is implemented as a wheel game (FIG. 7). The second game is implemented as a reel game which may utilise the same or different symbols to the base game. In this embodiment, the same symbols are used (FIG. 8).

In this embodiment, the feature comprises a plurality of "free" games (i.e. a plurality of plays of the first and second games). The second game is played first, involving a spin of the reels 400. For each free game a win may or may not occur. A win may be any particular line combination or scatter. If a win occurs, the first game is then played by the game controller representing a "spin" of the wheel represented in FIG. 7.

Referring to FIG. 7, the display controller 301 generates a display comprising a selector 500 having a plurality of outcome indicating parts 501 and an indicator 502. In this embodiment, the outcome indicating parts 501 form segments of a wheel, such that the selector 500 is represented as a wheel, and the indicator 502 is formed by plurality of chaser lights 502 about the circumference of the wheel 500. In this embodiment, the wheel has twelve segments 501. It will be appreciated that, in other embodiments, a wheel may have less or more segments than the wheel of FIG. 7. The invention is not limited to any particular number of segments.

Each segment is associated with a game outcome and in this embodiment the outcomes of all the segments apart from one are multipliers of a prize value, being a prize that has been awarded by an outcome of the second game. Some of the multipliers have higher values than others. In this example, there are 8×2 multipliers associated with eight output indicating parts 501, 2×10 multipliers associated with two outcome indicating parts 501 and 1×50 multiplier associated with one outcome indicating part 501. If the game controller determines an outcome represented by one of these outcome indicating parts, then the display is controlled such that the chaser lights 502 indicate the segment 501 associated with the selected outcome.

In this embodiment, the wheel display 500 is generated as a virtual display emulating a wheel with chaser lights. For example, it may be displayed on display 54, 14, 106 of the previously referenced figures. In one embodiment, it may be emulated by a top box 26 display of the stand alone machine 52 of FIG. 2.

As discussed above, if the indicator light 502 stops on a "multiplier" segment 501 then the prize awarded by the outcome of the second game is multiplied by the indicated amount.

If the game controller determines that the game outcome is re-spin, however, and the indicator light 502 stops on the re-spin segment, the following occurs:

As part of the wheel display 500 the display controller 301 also generates a further selector 503 at the centre of the wheel. In this embodiment, the further selector 503 is represented as a dice. The game controller then determines an outcome for a "roll" of the dice, and the display controller 301 controls the display so that the dice 503 appears to roll or spin. In this embodiment the die is conventional and has values of 1, 2, 3, 4, 5 or 6 for the respective six faces. The outcome value for the further selector (i.e. 1, 2, 3, 4, 5 or 6) multiplies all other segment 501 values by that outcome. If the outcome is a 6, for example, all the multiplier values in the other segments are multiplied by six.

The next step is that the game controller causes the first game to play again with the new, multiplied values for the segments 501. The indicator lights 502 stop on the determined outcome indicating part and a prize is then awarded to the player which is the prize awarded by the first game multiplied by the multiplier associated with the outcome indicating part 501 further multiplied by the outcome of the further selector 503. An advantage of this embodiment is that it enables higher prizes to be awarded by the wheel game than may be available from conventional wheel games. This is because the odds of hitting the re-spin segment are relatively low compared with landing on any of the other segments. With such lower odds, high prizes can be awarded for landing on that particular segment (i.e. by multiplying the other segments and subsequently re-spinning the wheel 500.

Another advantage, is that having the further selector 503 provides an entertaining "second level" of game play for the player. It is known that players find wheel games attractive, and also known that variability of games is attractive and maintains interest for players. Providing a variety of rewards in a variety of ways advantageously maintains the interest of the player.

In another embodiment, the player may be offered a choice of wheels 500. In this embodiment, the player may be able to use the player interface 50 to select which wheels they want to utilise in a feature game. In this embodiment, each of the wheels has different volatility. The more volatile the wheel the greater the wheel segment multipliers and the less the number of free games in the free game feature series. See the tables below: 10 free games:

10 Free Games:

| | Wheel Segment | 1st Spin | 2nd Spin | |
|---|---|---|---|---|
| 1 | *Re-Spin | 0.08333 | 0 | 0 |
| 2 | 2 | 0.08333 | 0.007576 | 0.219697 |
| 3 | 2 | 0.08333 | 0.007576 | 0.219697 |
| 4 | 2 | 0.08333 | 0.007576 | 0.219697 |
| 5 | 2 | 0.08333 | 0.007576 | 0.219697 |
| 6 | 2 | 0.08333 | 0.007576 | 0.219697 |
| 7 | 2 | 0.08333 | 0.007576 | 0.219697 |
| 8 | 2 | 0.08333 | 0.007576 | 0.219697 |
| 9 | 2 | 0.08333 | 0.007576 | 0.219697 |
| 10 | 10 | 0.08333 | 0.007576 | 1.098485 |
| 11 | 10 | 0.08333 | 0.007576 | 1.098485 |
| 12 | 50 | 0.08333 | 0.007576 | 5.492424 |
| | | 1 | 0.083333 | 9.44697 |

15 Free Games:

| | Wheel Segment | 1st Spin | 2nd Spin | |
|---|---|---|---|---|
| 1 | *Re-Spin | 0.083333 | 0 | 0 |
| 2 | 1 | 0.083333 | 0.007576 | 0.109848 |
| 3 | 1 | 0.083333 | 0.007576 | 0.109848 |
| 4 | 1 | 0.083333 | 0.007576 | 0.109848 |
| 5 | 2 | 0.083333 | 0.007576 | 0.219697 |
| 6 | 2 | 0.083333 | 0.007576 | 0.219697 |
| 7 | 2 | 0.083333 | 0.007576 | 0.219697 |
| 8 | 2 | 0.083333 | 0.007576 | 0.219697 |
| 9 | 3 | 0.083333 | 0.007576 | 0.329545 |
| 10 | 3 | 0.083333 | 0.007576 | 0.329545 |
| 11 | 10 | 0.083333 | 0.007576 | 1.098485 |
| 12 | 25 | 0.083333 | 0.007576 | 2.746212 |
| | | 1 | 0.083333 | 5.712121 |

20 Free Games:

| | Wheel Segment | 1st Spin | 2nd Spin | |
|---|---|---|---|---|
| 1 | *Re-Spin | 0.083333 | 0 | 0 |
| 2 | 1 | 0.083333 | 0.007576 | 0.109848 |
| 3 | 1 | 0.083333 | 0.007576 | 0.109848 |
| 4 | 1 | 0.083333 | 0.007576 | 0.109848 |
| 5 | 2 | 0.083333 | 0.007576 | 0.219697 |
| 6 | 2 | 0.083333 | 0.007576 | 0.219697 |
| 7 | 2 | 0.083333 | 0.007576 | 0.219697 |
| 8 | 2 | 0.083333 | 0.007576 | 0.219697 |
| 9 | 2 | 0.083333 | 0.007576 | 0.219697 |
| 10 | 5 | 0.083333 | 0.007576 | 0.549242 |
| 11 | 8 | 0.083333 | 0.007576 | 0.878788 |
| 12 | 10 | 0.083333 | 0.007576 | 1.098485 |
| | | 1 | 0.083333 | 3.954545 |

As an alternative to the player selecting which wheel they wish to have for the feature game, the system may make the selection based on a predetermined factor or factors.

Figure 9:
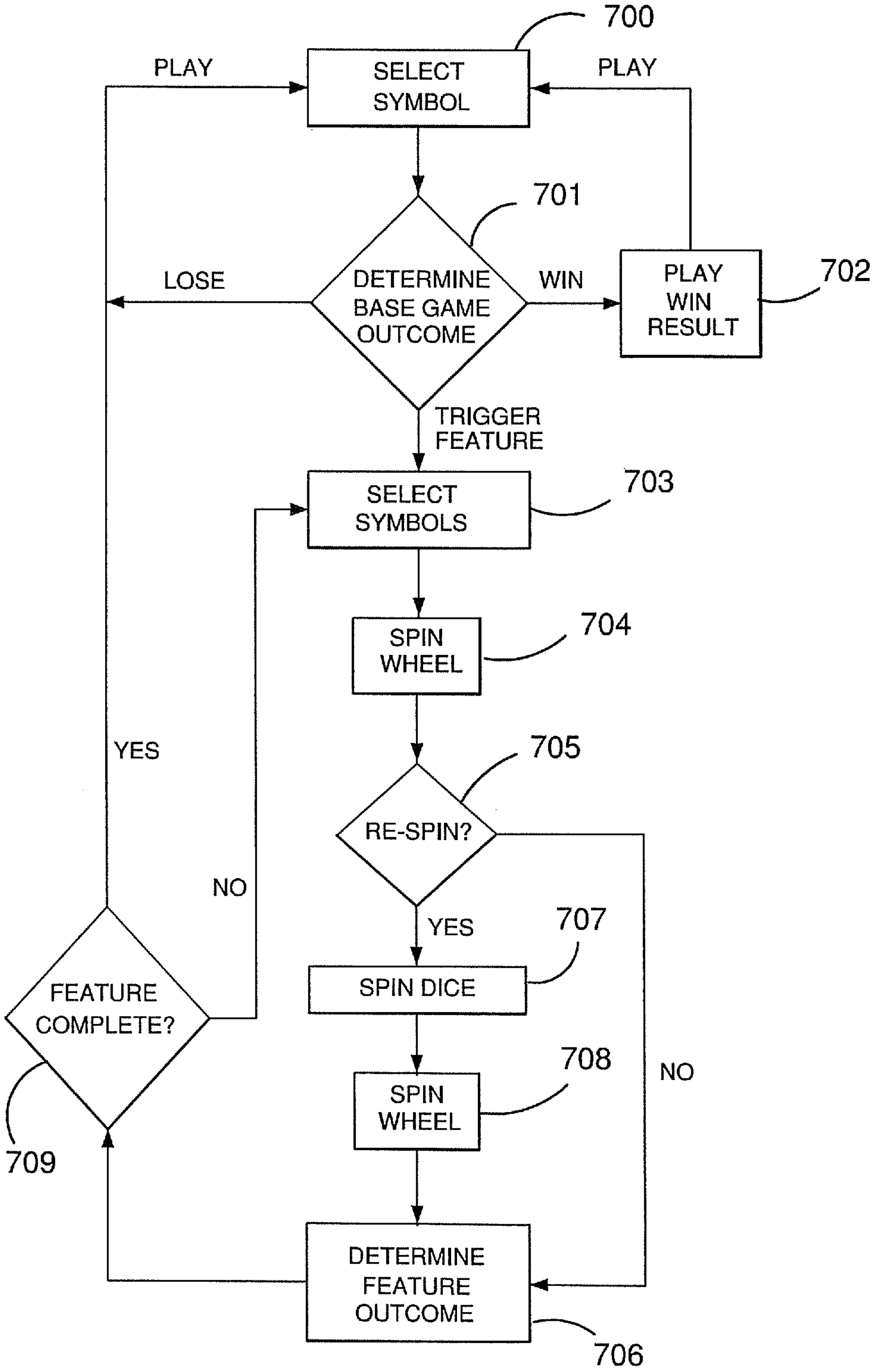
FIG. 9 is a flow diagram illustrating operation of a gaming system in accordance with an embodiment of the present invention.

The game playing process of the embodiment described with reference to FIGS. 7 and 8 will now be summarised with reference to FIG. 9.

At step 700, the base game is played by a selection of symbols from the symbol store 303 by the symbol selector 302. At step 701 an outcome of the base game is determined. Depending on the combination of symbols this may be a "Win", in which case a Win Result (Step 702) is determined for the player. The player may then have the choice to play again. If the result is a "Lose" Result, the player again has the choice of whether or not to play again. A further outcome for the base game is to trigger the feature, in which case the first game and second game are played. In this embodiment, a plurality of free games involving the said first game and second game, are awarded to the player.

At Step 703, the game controller 300 selects the symbols and spins the emulated reels 400. A win outcome for the feature is determined and then at Step 704 the wheel 508 of FIG. 8 is spun. A display is controlled so that the outcome indicating portion 501 is indicated by the chaser lights 502.

At Step 705, it is determined whether the outcome indicating portion 501 is a re-spin portion. If "No" the feature outcome is determined at Step 706, in which case a prize may be awarded to the player based on the outcome of the spinning reels game 400 and the multiplier determined by the wheel 500 game. If it is determined that the outcome is re-spin, then a determination is made for an outcome of the further selector 707 (die) and the display is controlled to spin the dice. The outcome indicating segments on the wheel are then multiplied by the value of the die 503 and the wheel is spun again (Step 708). The feature outcome is determined (Step 706) based on the prize awarded by the reel game 400, multiplied by the multiplier of the wheel game 500 multiplied by the outcome of the die selector 503.

At Step 709, a determination is made as to whether or not the feature is complete (i.e. in this embodiment have all free games been played?). If the feature is not complete ("No") then the feature game returns to Step 703 and the reel game 400 is played again. If the feature is complete ("Yes") then the player may choose to play the base game again (Step 700). In this embodiment, the player is awarded three free games. This number may vary from embodiment to embodiment.

In the above embodiment, there is a single re-spin segment in the wheel game 500. The invention is not limited to a single re-spin segment. In other embodiments, there may be a plurality of re-spin segments.

In the above embodiment, the output indicating part 501 that instigates the further selector 503 is termed "re-spin". This is terminology only, and the invention is not limited to using this terminology. Any other terms may be used (or even symbols) to denote this particular outcome. For example, the term "re-play" may be used. The terminology merely represents a game outcome which designates a repeat play of the game.

In the above embodiment, the further selector is represented as a die. The invention is not limited to the further selector being represented as a die. Any suitable representation may be utilised. For example, an alternative representation would be a further wheel within the main wheel 500, having a plurality of segments each associated with an outcome.

In the above-described embodiments, the prizes associated with the wheel 500 are multipliers of outcomes of the second game. The invention is not limited to this. Any prizes may be associated with the segments 501 of the wheel 500. For example, a jackpot prize, or a number of free spins of the base game or the second game, or any other prize.

In the above described embodiments, the base game and second game are emulated as reels or implemented as actual reels. In an alternative embodiment, the display may not emulate reels but merely show the selected symbols in a non-reel format e.g. presenting them as emulated playing cards, or other graphical representations. In this embodiment, each selection of a set of symbols is equivalent to one "spin" of the reels.

The second game and base game need not necessarily be a game based on symbol selection, but could be any other type of game.

In the above described embodiment, the first game and second game are generated as a feature of a base game. In alternative embodiments, the first game and second game may stand alone and may not be associated with any base game.

In one embodiment, there may be no second game and, instead, the base game may trigger the wheel game as a feature.

In the above described embodiments, the wheel feature is an emulation of a wheel on a video display. In an alternative embodiment, the wheel display may comprise a mechanical wheel and indicator or electro-mechanical wheel and indicator. Embodiments of the invention may utilise any practical implementation of a wheel feature.

The further selector may also be implemented mechanically or electromechanically.

In the embodiment described with reference to FIG. 7, the indicator 502 comprises a plurality of chaser lights which select one or more of the outcome indicating parts 501. The indicator may take different forms from a plurality of distinct chaser lights. For example, the indicator may be an arrow or a type of indicator that travels around the periphery of the wheel in continuous or small steps. Alternatively the indicator may take the form of lighting up one or more of the outcome indicating parts. In yet a further embodiment, the indicator may be an arrow or other stationary marker and the segments may move relative to the indicator e.g. they may rotate in dependence on the first game.

In the above embodiments, the wheel feature is a traditional circular wheel, with the plurality of outcome indicating parts being segments of the wheel. In alternative embodiments, the wheel feature may be generally rectangular, triangular, or polygonal in overall shape. In an alternative embodiment, the feature may not be a wheel at all, and could be, for example, a series of adjacent segments with an indicator moving between the segments.

It will be appreciated that embodiments of the present invention may be implemented utilising program code. The program code may be supplied in a number of ways, for example, on a computer readable medium, such as a disc or a memory, or as a data signal (for example, by downloading it from a server).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A gaming system, comprising a game controller arranged to control operation of a plurality of different games, each game having a plurality of available game outcomes, and a display arranged to display a representation of play of each of the games, the representation of one of the games having a plurality of outcome indicating parts, the game controller being arranged to select a game outcome for the one game from the plurality of available game outcomes and use the game outcome for the one game as a basis for altering prize awarded by a subsequent game, the available game outcomes comprising a trigger outcome, wherein, when the game controller determines that the game outcome is the trigger outcome, the game controller adjusts a game outcome of the subsequent game with the game outcome for the one game to create adjusted available game outcomes and subsequently selects a game outcome for the one game from the adjusted available game outcomes.

2. A gaming system in accordance with claim 1, and wherein the game controller is further arranged to adjust the at least one available game outcome to vary a prize associated with the available game outcome.

3. A gaming system in accordance with claim 1, and wherein the game controller is further arranged to control the display to display a representation of a further selector associated with the adjustment for adjusting the at least one of the available game outcomes.

4. A gaming system in accordance with claim 3, and wherein a subsequent game comprises a representation of a die.

5. A gaming system in accordance with claim 4, and wherein the game controller is further arranged to control the display so that the die appears to roll and settle to show a face which represents the adjustment.

6. A gaming system in accordance with claim 1, and wherein the one game comprising a representation of a wheel, each of the outcome indicating parts being represented as a segment of the wheel.

7. A gaming system in accordance with claim 1, and wherein the game controller is further arranged to control operation of an alternative of the one game, the alternative of the one game comprising a second of representation to the one game providing game outcomes that are different than those of the one game.

8. A gaming system in accordance with claim 7, and further comprising a player interface enabling a player to select between the one game and the alternative of the one game.

9. A gaming system in accordance with claim 7, and wherein the one game and the alternative of the one game have different volatilities.

10. A gaming system in accordance with claim 1, and wherein the game controller is further arranged to control operation of the subsequent game, and wherein an outcome of the one game is a prize which depends on an outcome of the subsequent game.

11. A gaming system in accordance with claim 10, and wherein the game controller is further arranged to generate the one game and the subsequent game as a feature game in response to an outcome of a base game.

12. A gaming system, comprising a game controller arranged to control operation of a plurality of different games, and to control display of representations of play of a game and a subsequent game, the representation of the game comprising a selector having a plurality of outcome indicating parts and an indicator, the game controller being arranged to select a game outcome for the game from a plurality of available game outcomes and use the game outcome for the game as a basis for altering prize awarded by the subsequent game, and control the indicator to indicate the outcome indicating part associated with the game outcome, the game controller further being arranged to use a random process to determine an adjustment factor for adjusting an outcome of at least one of the plurality of available game outcomes, and to subsequently select from a representation of a further selector to display the adjustment factor.

13. A gaming system in accordance with claim 12, and wherein the game is a wheel game and the selector is represented as a wheel, each of the outcome indicating parts comprising a segment of the wheel.

14. A gaming system in accordance with claim 12, and wherein the game controller is further arranged to control the display to display a representation of the further selector as a die providing a plurality of multiplier outcomes as the adjustment factor.

15. A method of gaming for use with a gaming system having a gaming controller, the method comprising playing via the gaming controller of a plurality of different games, each game having a plurality of available game outcomes, displaying a representation of play of one of the games and a representation of play of a subsequent game, the representation of the one game comprising a selector having a plurality of outcome indicating parts and an indicator, selecting via the gaming controller a game outcome for the one game from the plurality of available game outcomes, using via the gaming controller the game outcome for the one game as a basis for altering prize awarded by the subsequent game, and controlling via the gaming controller of the indicator to indicate the outcome indicating parts associated with the game outcome, wherein at least one of the available game outcomes comprises a re-spin outcome, and when it is determined that the game outcome is the re-spin outcome, adjusting via the gaming controller and a random process at least one of the available game outcomes to create adjusted available game outcomes, and subsequently selecting via the gaming controller the game outcome from the adjusted available game outcomes.

16. A method in accordance with claim 15, and wherein adjusting the at least one of the available game outcomes comprises varying a prize associated with the game outcome.

17. A method in accordance with claim 15, and wherein, when it is determined that the game outcome for the one game is a re-spin outcome, the method further comprising displaying a representation of a further selector associated with the adjustment for adjusting the at least one of the available game outcomes.

18. A method in accordance with claim 17, and wherein the further selector is represented as a die.

19. A method in accordance with claim 18, and wherein displaying the representation of the die comprises representing the die as rolling and settling to show a face which represents the adjustment.

20. A method in accordance with claim 15, and wherein the first game is a wheel game, and wherein displaying a representation of the one game comprises displaying a wheel, each of the outcome indicating parts being represented as a segment of the wheel.

21. A method in accordance with claim 15, and further comprising playing an alternative of the one game and displaying a similar type of representation for the alternative of the one game as the one game, the alternative of the one game providing for different prizes.

22. A method in accordance with claim 21, and further comprising enabling a player selection between the one game and alternative of the one game.

23. A method in accordance with claim 21, and wherein the alternative of the one game having a different volatility to the one game.

24. A method in accordance with claim 15, and further comprising playing a subsequent game, and wherein the outcome of the one game is a prize which depends on an outcome of the subsequent game.

25. A method in accordance with claim 24, and further comprising generating the one game and subsequent game as a feature game in response to an outcome of a base game.

* * * * *